METHOD OF MAKING TERMINATED MICROWAFERS

Filed Aug. 12, 1963 3 Sheets-Sheet 1

INVENTORS
DOMENICK J. GARIBOTTI
KALMAR O. OLSON
JAMES E. TAYLOR
BY [signature]
ATTORNEY

METHOD OF MAKING TERMINATED MICROWAFERS

Filed Aug. 12, 1963 3 Sheets-Sheet 2

INVENTORS
DOMENICK J. GARIBOTTI
KALMAR O. OLSON
JAMES E. TAYLOR
BY [signature]
ATTORNEY

INVENTORS
DOMENICK J. GARIBOTTI
KALMAR O. OLSON
JAMES E. TAYLOR

BY [signature]
ATTORNEY

United States Patent Office 3,322,655
Patented May 30, 1967

3,322,655
METHOD OF MAKING TERMINATED MICRO-WAFERS

Domenick J. Garibotti, Longmeadow, Mass., and Kalmar O. Olson and James E. Taylor, Windsor Locks, Conn., assignors to United Aircraft Corporation, East Hartford, Conn., a corporation of Delaware Filed Aug. 12, 1963, Ser. No. 301,422
17 Claims. (Cl. 204—15)

This invention relates to microminiaturized electronic circuitry. More particularly, this invention is directed to the fabrication of terminated microwafers which constitute the basic buildings blocks utilized in the assembly of modular electronic packages.

One continuous and consistent trend in the history of electronics has been the reduction in the size and weight of the assembly needed for any particular electronic function. Coupled with the foregoing trend has been an ever increasing effort to increase reliability and decrease cost through standardization of modular packages and the techniques for assembling such packages. Many techniques for reducing the size, weight, and power consumption of electronic components, circuit assemblies, and function units have been proposed, demonstrated and, occasionally exploited. In some cases, for example, cord wood assemblies, individual components retain their individualities and are interconnected by relatively standard, although sophisticated, wiring techniques. In certain of the more refined approaches, a number of recognizable devices are combined into an integrated structure in which the interconnecting structural medium between the devices contributes to the electrical properties of the circuit. The latter concept produces devices which are generally known as functional electronic blocks or crystal circuits. The functional electronic block or crystal circuit relies on the creation of many pn junctions on one slab of host semiconductor material coupled with the realization that semiconductor materials can be fashioned in such a way that other regions within the slab will yield capacitive and resistive effects. For a discussion of the fabrication of functional electronic blocks, reference may be made to copending application Ser. No. 186,467, filed Apr. 10, 1962, by L. R. Ullery, Jr. and D. J. Garibotti, now Patent No. 3,178,804, issued Apr. 25, 1965, as co-inventors and assigned to the same assignee as this invention. Another existing approach to microminiaturization includes the use of specially shaped elements to facilitate denser circuit assemblies. Within this class of elements are the so-called "dot" components. A further area in which considerable progress has been made is the production of thin film circuitry and components.

While each of the foregoing approaches to microminiaturization, and other methods not mentioned, have desirable attributes, the cord wood assembly approach is the only prior art method which provides the necessary inter and intra connection flexibility. As should be obvious, the cord wood assemblies suffer from volumetric inefficiency and environmental limitations. The latter limitations arise because, to enhance structural integrity, the cord wood assemblies are usually potted. These potting compounds may not be used in high temperature environments since they flow at elevated temperatures. Inter and intra connection flexibility is necessary because none of the previous microminiaturization approaches can, standing alone, provide a complete variety of circuit elements as is necessary for the assembly to perform a complex electronic function. For example, considering the functional electronic block approach, some passive devices may not be fabricated within the elemental block. That is, it is now and probably will remain impossible to create precise temperature independent resistors, non-voltage dependent capacitors, large capacitors required for analog circuitry, inductors, transformers, and storage devices within a chip of semiconductor material. Thus, in order to perform complex electronic functions, the functional electronic blocks must be used in conjunction with outside components. This same disadvantage, although in relation to different circuit devices, is inherent in the "dot" and thin film approaches.

Very recently, a method of assembling a modular electronic package was invented which resulted in a great step forward in the art. The result of this process was a novel modular electronic package, known as the Enhanced Micro-Module, which can be assembled on an automated basis and which provided excellent heat transfer characteristics and high interconnection capacity. For a more detailed description of the Enhanced Micro-Module, reference is made to copending application Ser. No. 290,368, filed June 25, 1963, by L. R. Ullery, Jr., now Patent No. 3,243,661, and assigned to the same assignee as this invention. The basic building block of the Enhanced Micro-Module is a standardized microwafer having a plurality of conductive pads or terminations on one or more edges thereof. In the assembly of the Enhanced Micro-Module, microminiaturized circuit components of any suitable type are affixed to the surfaces of each terminated microwafer and are electrically connected, by conductors or thin film circuitry, to the edge terminations thereon. The microwafers are then stacked or decked and interconnected by conductors which make contact with respective terminations on the edge of each of the microwafers.

As stated above, the invention of the Enhanced Micro-Module provided the art with a packaging technique compatible with all types of microminiaturized components. However, to realize the obvious advantages of the Enhanced Micro-Module, and particularly the high cross-over capability, a relatively large number of conductive termination pads had to be formed with high precision on the edges of the wafers or circuit boards on a mass production basis. In the prior art, such terminations were formed by metalizing techniques, not susceptible to mass production, such as the silk screen, spraying, brushing, tape or decal transfer, dipping or photo etching processes. By these processes, molymanganese, titanium hydride or active alloys were applied to discrete areas on the wafers or boards. As is well known in the art, these metalizing techniques inherently can not provide sufficient precision or resolution for use where a large number of small terminations must be built up along the edge of a board with extremely small spacing therebetween. All of these metalizing techniques also suffer from the disadvantage that they can only be employed on high temperature boards such as ceramic substrates because of a necessary firing step.

Probably the most difficult problem from the standpoint of both reliability and automation of assembly that has hampered the prior art packaging techniques centered around interconnecting or joining the various circuit components to each other and to circuit boards. In the past, interconnection failures have been high. This is largely due to the joining technique used which was soldering. Due to the inherent possibility of cold solder joints, soldering has long been suspect as an extremely unreliable process. Also, soldering usually causes the addition of unwanted fluxes to the assembly which in turn may cause contamination of junction devices. Further, with the exception of dip-soldering, assembling a micromodule by conventional soldering techniques is a process not susceptible to automation. Dip-soldering is unacceptable today due to the limitation it places on component density. That is, dip-soldering has an inherent disadvantage in that leads cannot be closely spaced if the solder is to drain off between terminals. As should be obvious, to be economically practicable for everyday use, a modular electronic package such as the Enhanced Micro-Module must be assembled in an automated manner. It has been known for some time that the inherent deficiencies of soldering could be avoided by electron beam welding or soldering of leads and conductors to termination pads. However, the above-mentioned prior art metalizing techniques will not provide termination pads to which leads and conductors may be welded. That is, the pad thickness realized by the metalizing techniques is not sufficiently thick to permit the forming of a fusion bond therewith.

This invention overcomes the aforementioned disadvantages by providing a novel process for the production of conductive termination pads on a micro-circuit wafer or board.

It is therefore an object of this invention to provide a terminated microwafer.

It is another object of this invention to provide a method of producing a terminated microwafer having high resolution and precision.

It is also an object of this invention to provide a terminated microwafer having a large number or high density of edge terminations thereon.

It is yet another object of this invention to provide a mass production method of fabricating terminated microwafers.

It is a further object of this invention to provide a microwafer having terminations thereon to which conductors may be welded.

It is still another object of this invention to fabricate terminated microwafers in a more economical way than previously possible.

It is another object of this invention to provide a standardized, terminated microwafer for use in a modular electronic package which may be assembled in an automated manner.

These and other objects of this invention are realized through the formation of edge terminations on standard substrate wafers or boards. These terminations are formed by first depositing conductive material in the form of discrete pads along the edges of the wafer and thereafter plating these pads to build up a surface to which conductors may be welded.

This invention may be better understood and its numerous advantages will become apparent to those skilled in the art by reference to the accompanying drawing wherein like reference numerals apply to like elements in the various figures and in which.

Figures 1, 2, 3, 4, 5:
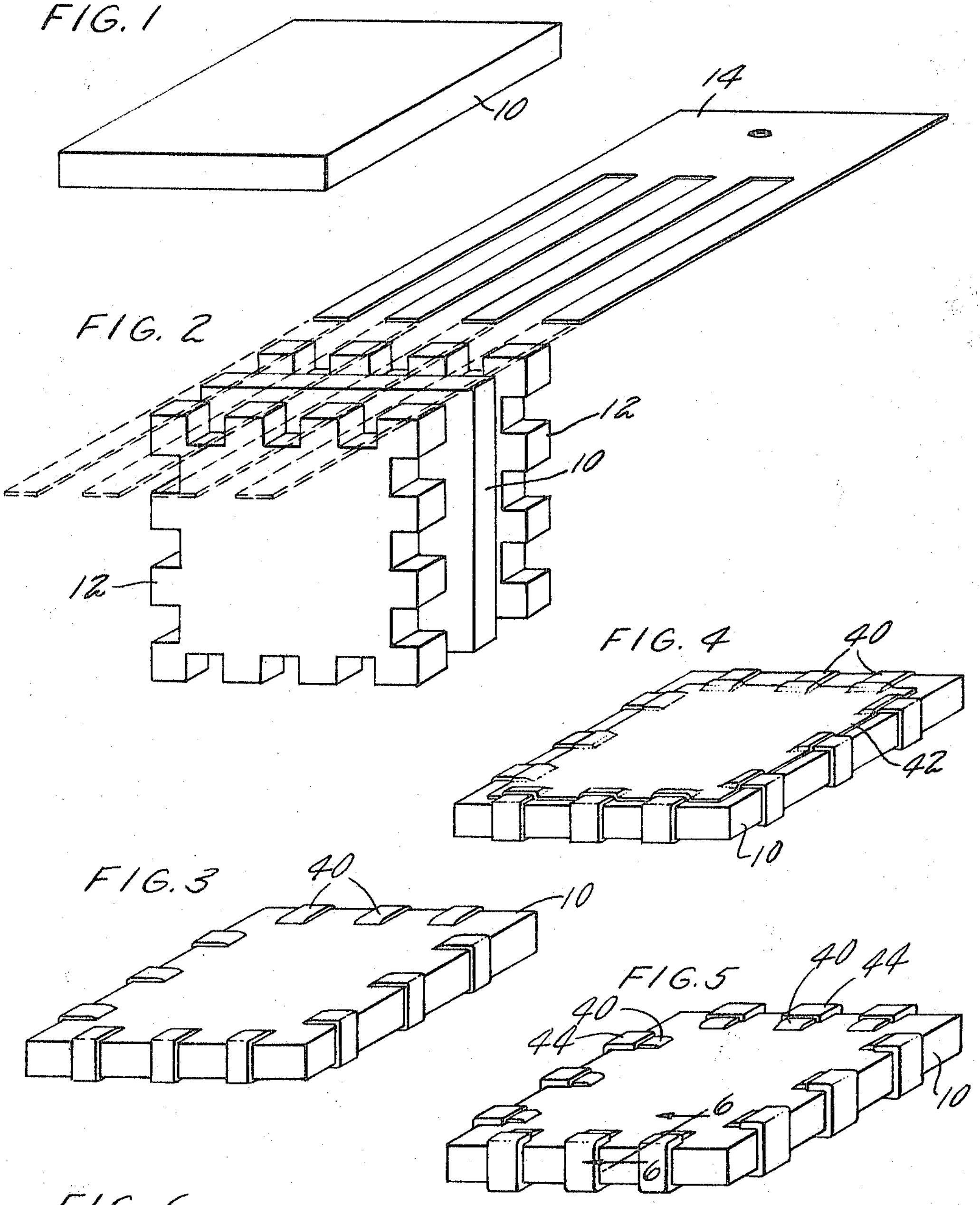
FIGURE 1 is a perspective view of a substrate wafer that will be used in the fabrication of a terminated microwafer in accordance with this invention.
FIGURES 2 through 5 show the results of the various steps performed in the fabrication of a terminated microwafer in accordance with this invention.

As mentioned above, the basic element of the Enhanced Micro-Module and/or other miniaturized electronic subassemblies is the substrated board or microwafer which may consist of either a ceramic, such as alumina or beryllia, a supercooled liquid, such as glass, or a printed circuit board comprised of a polymeric material. For many uses the ceramics are to be preferred since these materials have superior heat transfer characteristics, they are lightweight, they are insulators, and they are structurally strong. Referring now to FIGURE 1, a typical substrate wafer is shown. This wafer 10 will typically have dimensions of .31 x .31 inch on a side and will be .01 or .02 inch thick. After incoming inspection directed to soundness, surface roughness, and tolerances; a plurality of substrate wafers are loaded into holders for a preparation step which includes cleaning and drying. Cleaning the wafers is accomplished by first washing with a degreasing solvent such as trichlorethylene. Next, the wafers are washed with a detergent in an ultrasonic bath to remove any film left by the degreasing solvent. Finally, the wafers are exposed to a Freon rinse to remove any remaining dust particles. Alternatively, any other of the suitable cleaning procedures known in the art may be employed. After cleaning, the wafers are placed in a fixture which is in turn positioned in a vacuum deposition apparatus.

The purpose of the vacuum deposition or sputtering step is to form discrete conductive areas on one or more edges of the wafers. These conductive areas, which ultimately will form the edge termination pads to which the devices affixed to the surfaces of the wafers will be connected and the interconnecting conductors will be welded, must, to permit sufficiently high component packaging density, be formed with high geometrical precision. In a typical case, terminations will be .014±.002 inch wide and will be spaced on .025±.001 inch centers. Also, the terminations should preferably be tapered so that electrical connection can be made to thin film components formed on the surfaces of the wafers without the points of high resistance or hot spots which are associated with conventional metalized terminations. Another requirement of the edge treminations, which also places restrictions upon the deposition step, is that the terminations be wrapped around the substrate to provide continuity from one side to the other and to the edge so as to further enhance component packaging density. In order to fulfill the above stated requirements, as wafer holding fixture designed to hold the substrates at the corners is utilized. An older fixture of this type is shown in copending application Ser. No. 272,140, filed Apr. 10, 1963, by James E. Taylor and assigned to the same assignee as this invention. The fixture shown in the Taylor application permits the formation of terminations on only a single edge of the wafers at one time and thus, in the interest of increased production, has been modified so as to expose all four edges of the wafers during the deposition step. In the wafer holding fixture, the plurality of individual wafers such as wafer 10 are separated by spacer masks 12 shown in FIGURE 2. The notched portions of masks 12 define the termination geometry on the surfaces of the wafers. Next, a comb mask 14 is placed over each side of the alternately stacked wafers and spacer masks to define the termination geometry on the edges of the wafers. As can be seen from FIGURE 2, comb-like mask 14 is placed in contact with the edges of the wafers and the spacer masks in such a manner that the teeth of the comb mask cover the teeth of the spacer masks. The fixture precisely locates the wafers and masks relative to each other and holds the wafer-spacer mask stack in compression and the comb mask in tension against the stack.

Figure 7:
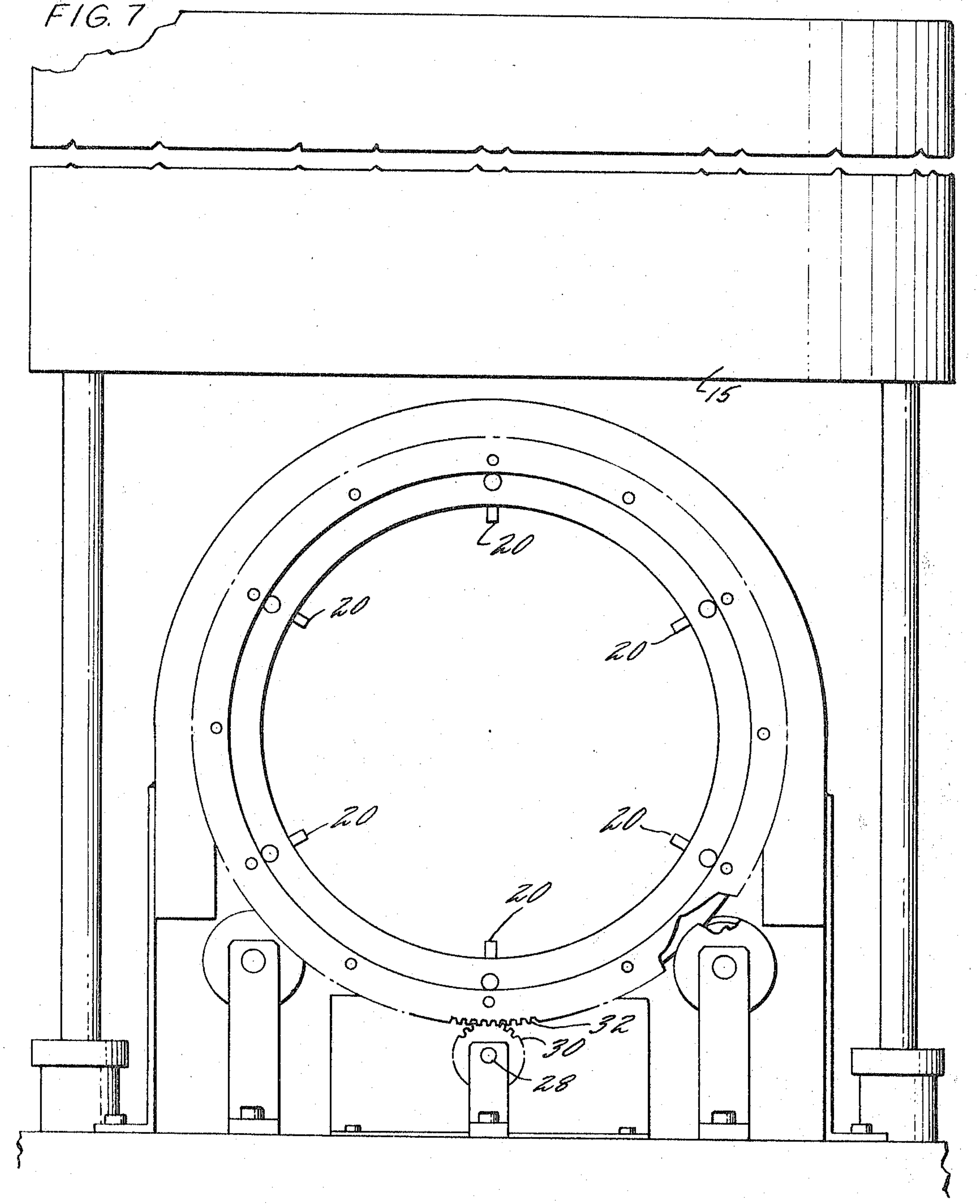
FIGURES 7 and 8 are side and front views, respectively, of a novel apparatus which is utilized to deposit discrete conductive pads on the edges of the microwafers fabricated in accordance with this invention.
Figure 8:
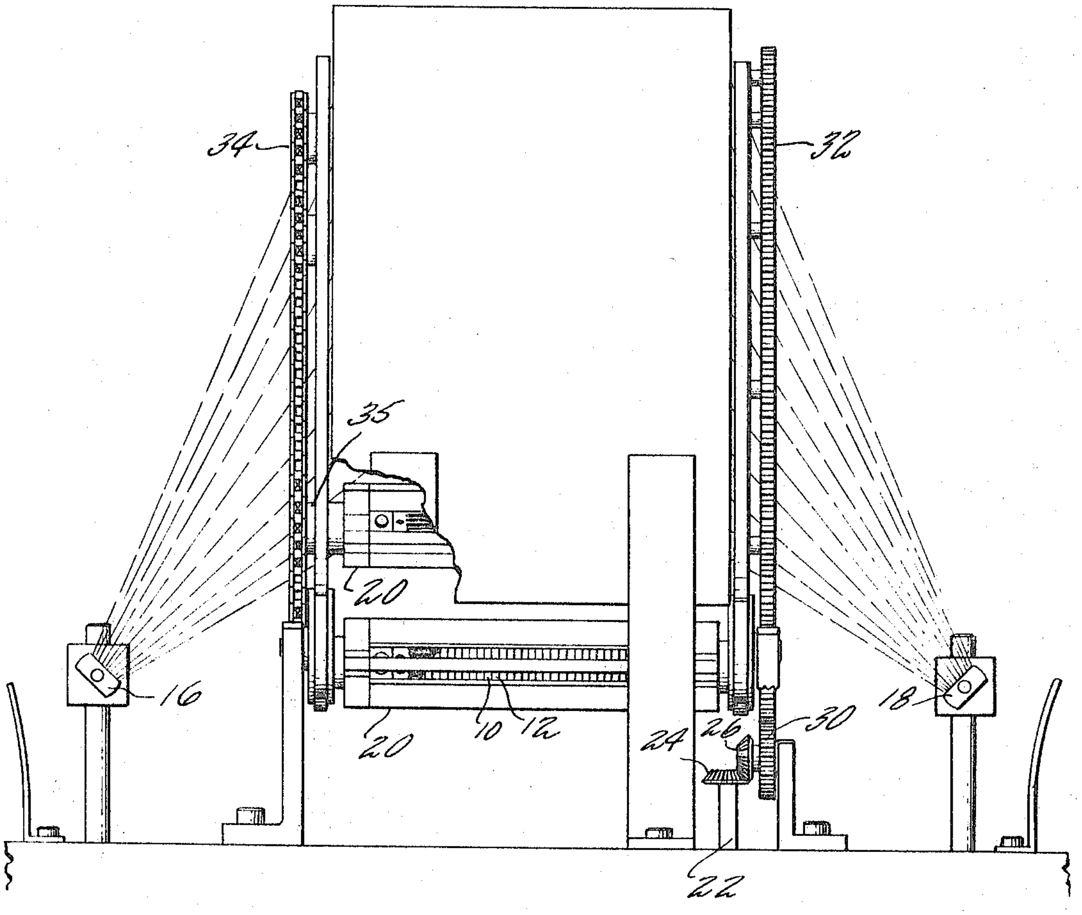

After loading, several fixtures are placed in a vacuum deposition apparatus of the type shown in FIGURES 7 and 8. In the vacuum deposition apparatus, discrete edge terminations are formed by the vacuum deposition or sputtering of suitable conductive materials on the exposed areas of the wafers. In a preferred embodiment, chromium followed by gold is deposited. It should be understood that the first conductive layer may be Cr, Ti, Zr, Mn, Ta or Co while the second conductive layer may be Au, Cu, Ni, Ag, Ta or Al. Chromium is vacuum deposited on the wafers first since it affords a tenacious bond with most wafer materials. A gold coating is then deposited over the chromium film to minimize pad resistance. The thickness of the coatings of chromium and gold are about 100 and 1000 to 25,000 angstroms respectively. In order to insure that terminations will be deposited on all four edges of the wafers in a single step, the wafer fixtures are positioned in a ferris wheel-like device which is mounted in a vacuum tank 15. The ferris wheel moves the wafers and masks about the vapor sources and rotates each fixture about its own axis and also about the axis of the ferris wheel.

Referring now to FIGURES 7 and 8, vapor sources 16 and 18 are located outside the ferris wheel and slightly below its axis of rotation to permit vapor incidence upon the wafers at an angle. Unless the vapor flux is made to impinge obliquely relative to the edges of the stacked wafers, coating of the surfaces of the wafers in the areas defined by spacer-masks 12 would not occur. Also, this oblique impingement of the vapor is conducive to the formation of tapered terminations. The vapor streams are directed such that as the ferris wheel rotates, terminations are deposited on all four edges and both surfaces as desired on a large number of wafers in six or more fixtures 20. The ferris wheel is driven by a motor, not shown, through shaft 22 which drives a gear 24. Gear 24 in turn drives gear 26 which is keyed to a shaft 28. Also keyed to shaft 28 is a gear 30 which engages teeth on a rim-like member 32 which is attached to one edge of the ferris wheel. Adjacent the other edge of the ferris wheel is a chain 34. The links of chain 34, which is stationary, are engaged by sprockets which are mounted on shafts 35 which extend through the side of the ferris wheel and are rigidly attached to the wafer fixture holder. The sprockets and shafts are free to rotate. Thus, as the ferris wheel assembly is driven, the sprockets will traverse the inside of chain 34 thereby causing the wafer fixtures to rotate about their own axes. A heater assembly employing a plurality of quartz lamps, not shown ,envelops approximately two thirds of the ferris wheel surface. According to standard practice, the substrates are outgassed at 350° C. for approximately one-half hour after a pressure of $10^{-5}$ torr has been reached. Deposition of chromium and gold follows according to standard practice as discussed at pages 112–114 and 169–195 of "Vacuum Deposition of Thin Films," by Holland, 1958 edition, published by Chapman and Hall, Ltd., of London. The resultant microwafer is shown in FIGURE 3 where 40 indicates the plurality of chromium-gold pads which have been deposited on the edges and adjacent surfaces of the substrate wafer.

After cooling to room temperature, the microwafers are removed from the edge-holding fixtures and are refixtured so as to unmask and expose their surfaces except for a small picture frame strip around the periphery. The fixtures are then again loaded into the ferris wheel and, when a pressure of approximately $10^{-5}$ to $10^{-6}$ torr is reached, aluminum is deposited on the inner exposed face surfaces of the microwafers from a source of Al vapor, not shown, placed within the rotating ferris wheel. The outer exposed face surfaces of the microwafers are coated from a second source, not shown, placed underneath the ferris wheel. These sources typically will be helical tungsten filaments with a bar of aluminum in the center thereof. The aluminum area film, indicated at 42 of FIGURE 4, is deposited to interconnect or short-out the previously deposited terminations for the purpose to be explained below.

The microwafers are next removed from the vacuum deposition apparatus and an oxide coating is caused to form on the Al film. While there are several methods by which the oxide coating can be produced, in a preferred embodiment the fixtures are loaded in an electroplating fixture which is placed in an anodizing bath to promote build-up of an oxide coating on the vacuum deposited aluminum interconnecting film. Several anodizing solutions are available for aluminum. Depending upon the solution chosen, growth of the oxide coating will either continue as long as a potential is applied or the limiting thickness of the oxide will be a function of the applied voltage. Solutions wherein growth will continue as long as potential is applied are normally used for commercial anodizing and are denoted by the fact that the oxide layer is porous. The second type solution is characterized by a resulting oxide layer which is nonporous and glass-like. By proper control of the applied voltage it is possible to obtain reproducible, impervious films of $Al_2O_3$ which will, for the reasons to be explained below, prevent undesired electroplating upon the underlying aluminum film itself. Several electrolytes which will permit production of a nonporous oxide coating are available. These electrolytes are discussed at page 345 of "Vacuum Deposition of Thin Films," by Holland, 1960 edition, published by John Wiley & Sons, New York. For the purpose of producing terminated microwafers, a 10% $H_2SO_4$ solution in distilled water is a suitable electrolyte. The anodizing bath consists of a glass tank with a cover to prevent contamination. The cathode in this bath will be high purity aluminum sheet or mesh and the applied D.C. voltage will be 5 volts.

After the oxide coating is formed on the Al area film, the electroplating fixtures are removed from the anodizing bath and rinsed off. Next, electrical contact is made with the aluminum interconnecting film by breaking through the oxide coating. In actual practice, it is unnecessary to physically puncture the oxide coating on each wafer since the fixure will mask a portion of the Al area film and thus provide electrical contact to the Al film on each wafer by attaching a clamp to the fixture. The wafers are then placed in an electroplating apparatus wherein the discrete terminations are electroplated with nickel, copper or any other suitable metal or alloy to an over-all thickness of .0005 to .002 inch. In an alternate approach, the wafers with the aluminum coating are stacked together prior to anodization but separated by means of a conducting rubber member which provides electrical interconnection between succeeding surfaces of the wafers. The purpose of a layer of nickel or copper, which will only be deposited on the unanodized and metallized portions of the wafers, is to provide a surface to which interconnecting ribbons or conductors may be readily welded. That is, pads to which leads may be welded are built-up on the edges of the wafers by the electroplating process thereby promoting reliability since the thicker the pad the easier it is to weld because there is more material for forming an alloy bond with the leads.

Figure 6:
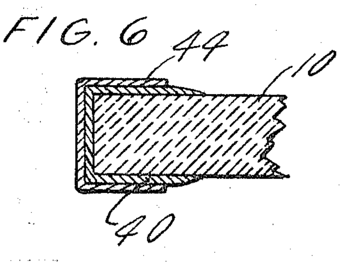
FIGURE 6 is a view along line 6—6 of FIGURE 5 showing a completed termination in cross-section.

When sufficient termination thickness has been achieved, the wafers are taken out of the electroplating bath and the Al film and its oxide coating are removed by immersion in an alkaline solution or by other standard techniques. Preferably, a single step removal process is utilized wherein the wafers are immersed in a low concentration solution of sodium hydroxide to dissolve the aluminum. This step is based on the knowledge that aluminum is attacked and dissolved in alkaline solutions whereas most other metals are not. That is, NaOH will not take off the gold and chromium nor will it attack aluminum oxide. Rather, the NaOH reacts with and dissolves the aluminum under the oxide which then peels off. The result of the anodizing-electroplating-removal steps are shown in FIGURES 5 and 6. In FIGURES 5 and 6, the nickel or copper coating is shown at 44. It should be noted that, as can be clearly seen from FIGURE 6, the resultant terminations are, because of the nature of the vacuum deposition process, tapered. As mentioned above, tapered terminations are often desirable for connection to thin film components without the points of high resistance or hot spots associated with conventional terminations. The completed terminated microwafer shown in FIGURE 5 only has three terminations on each edge thereof. However, in actual practice, .014 inch wide termination will typically be formed on 25 mil centers on one or more edges of each .31 inch square standard microcircuit wafer. Thus, the microcircuit wafer will typically have 9 terminations pads on each edge thereof.

While a preferred embodiment of this invention has been shown and described, various modifications and substitutions may be made without deviating from the spirit and scope of this invention. For example, it is to be understood that the terminated microwafers of this invention may, subsequent to their fabrication, have area thin films deposited thereon for the production of thin film components and circuitry. Thus, this invention is described by way of illustration rather than limitation.

We claim:

1. A method of forming conductive pads on a circuit board comprising the steps of:
stacking a micro-circuit board between spacer masks having notches along at least one edge thereof to mask all but discrete areas of both face surfaces of the board, said discrete areas adjoining an edge of the board and being aligned on opposite sides of the board;
positioning a comb mask over a side of the board and spacer mask stack with the teeth of the comb mask in registration with the areas of the spacer masks between the notches to mask all but discrete areas on the edge of the board, which areas communicate with the unmasked areas of the face surfaces of the board; and
depositing conductive material on the discrete unmasked areas of the face surfaces and edge of the board whereby conductive pads extending from surface to surface over the edge of the board are formed.

2. The method of claim 1 further comprising:
plating the deposited conductive material with another conductive material so as to build up the thickness of conductive material in the discrete areas to a point where it may be welded.

3. The method of claim 2 wherein the step of depositing comprises:
placing the mask-board assembly in the vacuum chamber of a vapor deposition apparatus, and
causing conductive material to be evaporated at points spaced from and at an angle with respect to the assembly whereby the conductive material vapor will condense on the unmasked portions of the board and will form a tapered deposit on the sides thereof.

4. The method of claim 3 wherein the step of causing the conductive material to be evaporated comprises:
vaporizing a first conductive material which will form a tenacious bond with the surface of the board material, and
vaporizing a second conductive material which will form a low resistance layer over the first material.

5. The method of claim 2 wherein the step of plating comprises:
depositing a layer of conductive material over the face surfaces of the board except for an area around at least one edge thereof whereby the layer of conductive material is in electrical contact with but does not completely cover the the previously deposited conductive termination pads,
producing a nonconductive oxide coating on the layer of conductive material covering the surfaces of the board,
making electrical contact with the layer of conductive material under the oxide coating,
placing the board in an electroplating apparatus whereby conductive material will be deposited on the exposed conductive material of the termination pads and not on the board material or oxide coating,
removing the board from the electroplating apparatus when the desired termination pad thickness has been built up, and
stripping the layer of conductive material and its oxide coating from the board.

6. The method of claim 5 wherein the step of depositing a layer of conductive material over the face surfaces of the board comprises:
masking the face surfaces of the board with a pair of picture frame masks,
placing the masked board in a vacuum deposition apparatus, and
evaporating aluminum which will condense on the unmasked portions of the face surfaces of the board.

7. The method of claim 6 wherein the step producing an oxide coating comprises:
anodizing the aluminum layer which was deposited on the face surfaces of the board.

8. The method of claim 7 wherein the step of stripping comprises:
removing the layer of aluminum and its oxide coating by placing the board in a solution which dissolves the aluminum and thus causes the oxide coating to peel off.

9. The method of claim 8 wherein the step of removing comprises:
placing the board in a sodium hydroxide bath.

10. The method of claim 4 further comprising:
plating the deposited conductive material with another conductive material so as to build up the thickness of conductive material in the discrete areas to a point where it may be welded.

11. The method of claim 10 wherein the step of plating comprises:
depositing a layer of conductive material over the face surfaces of the board except for an area around the edges thereof whereby the layer of conductive material is in electrical contact with but does not cover the previously deposited conductive termination pads,
producing an oxide coating on the layer of conductive material covering the surfaces of the board,
making electrical contact with the layer of conductive material under the oxide coating,
placing the board in an electroplating apparatus whereby conductive material will be deposited on the exposed conductive material of the termination pads and not on the board material or oxide coating,
removing the board from the electroplating apparatus when the desired termination pad thickness has been built up, and
stripping the layer of conductive material and its oxide coating from the board.

12. The method of claim 11 wherein the step of depositing a layer of conductive material over the face surfaces of the board comprises:
masking the face surfaces of the board with a pair of picture frame masks,
placing the masked board in a vacuum deposition apparatus, and
evaporating aluminum which will condense on the unmasked portions of the face surfaces of the board.

13. The method of claim 12 wherein the step producing an oxide coating comprises:
anodizing the aluminum layer which was deposited on the face surfaces of the board.

14. The method of claim 13 wherein the step of stripping comprises:
removing the layer of aluminum and its oxide coating by placing the board in a solution which dissolves the aluminum and thus causes the oxide coating to peel off.

15. The method of claim 14 wherein the step of removing comprises:
placing the board in a sodium hydroxide bath.

16. A masking technique comprising:
forming at least a first layer of a material on at least a portion of a first surface of a nonconductive substrate;
depositing an aluminum film over at least a portion of said material, the portion of said material not covered by said aluminum film compirsing a region of material to be treated;
anodizing the exposed surface of the aluminum film to a desired depth to provide a nonporous, nonconductive oxide coating thereon;

treating the exposed portion of said material; and removing the anodized aluminum film by dissolving the aluminum from under the oxide coating with a suitable solvent.

17. The method of claim 16 wherein the step of treating comprises:

making electrical contact with the aluminum film; and electrolytically treating the exposed portions of the first material, the current path to the first material being esablished through the aluminum film.

References Cited

UNITED STATES PATENTS

| | | | |
|---|---|---|---|
| 2,834,723 | 5/1958 | Robinson | 204—15 |
| 2,847,325 | 8/1958 | Riseman et al. | 117—107.1 |
| 2,861,029 | 11/1958 | Bain et al. | 204—15 |
| 3,097,959 | 7/1963 | Zachman | 117—43 |
| 3,192,135 | 6/1965 | Robbins | 204—15 |
| 3,243,661 | 3/1966 | Ullery | 317—101 |

JOHN H. MACK, *Primary Examiner.*

T. TUFARIELLO, *Assistant Examiner.*